United States Patent
Kushiyama et al.

(10) Patent No.: US 7,179,199 B2
(45) Date of Patent: Feb. 20, 2007

(54) CONTROL SYSTEM FOR VEHICLE HAVING AN ENGINE CAPABLE OF PERFORMING AND STOPPING COMBUSTION IN EACH CYLINDER

(75) Inventors: Hiroyuki Kushiyama, Wako (JP); Shinichi Nishio, Wako (JP); Takehiro Katakura, Wako (JP); Kenji Nakajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 261 days.

(21) Appl. No.: 10/998,569

(22) Filed: Nov. 30, 2004

(65) Prior Publication Data
US 2005/0130797 A1  Jun. 16, 2005

(30) Foreign Application Priority Data
Dec. 16, 2003  (JP) .............................. 2003-418643

(51) Int. Cl.
*B60W 10/02* (2006.01)
(52) U.S. Cl. .................... 477/181; 477/83; 477/90; 477/110; 477/169; 477/173; 477/174; 477/906
(58) Field of Classification Search .................. 477/83, 477/90, 110, 166, 168, 169, 173, 174, 181; 123/198 F, 481
See application file for complete search history.

(56) References Cited

U.S. PATENT DOCUMENTS

| 4,428,467 A | | 1/1984 | Hiramatsu |
| 4,733,580 A | * | 3/1988 | Kubo et al. .................. 477/129 |
| 5,213,186 A | * | 5/1993 | Murata ........................ 477/169 |
| 5,540,633 A | * | 7/1996 | Yamanaka et al. .......... 477/107 |
| 6,892,126 B2 | * | 5/2005 | Tashiro et al. ................ 701/54 |
| 2002/0115526 A1 | * | 8/2002 | Wakashiro et al. ............ 477/5 |
| 2005/0197236 A1 | * | 9/2005 | Doering ...................... 477/181 |

FOREIGN PATENT DOCUMENTS

| JP | 57195835 A | * | 12/1982 |
| JP | 60-60039 | | 4/1985 |

* cited by examiner

*Primary Examiner*—David D. Le
(74) *Attorney, Agent, or Firm*—Westerman, Hattori, Daniels & Adrian, LLP.

(57) ABSTRACT

A control system for a vehicle includes an engine switch control unit for switching the operating condition of the engine between the all-cylinder operating condition and the partial-cylinder operating condition, a failure determining unit for determining the failure of the lockup clutch control device, and a coupling capacity change inhibiting unit for inhibiting a change in coupling capacity of the lockup clutch accompanied by the switch control of the operating condition of the engine by the engine switch control unit during the failure determination by the failure determining unit.

5 Claims, 15 Drawing Sheets

CONTROL SYSTEM FOR VEHICLE HAVING AN ENGINE CAPABLE OF PERFORMING AND STOPPING COMBUSTION IN EACH CYLINDER

BACKGROUND OF THE INVENTION

1. Field of the Invention

The present invention relates to a control system for detection of the failure of a lockup clutch in a vehicle having an engine capable of performing and stopping combustion in each cylinder group.

2. Description of the Related Art

A lockup clutch in an automatic transmission is usually engaged at a predetermined shift position for the purposes of improvement in fuel economy or the like. A method of controlling the slip amount of the lockup clutch according to an operating condition is generally adopted to absorb the shock due to complete engagement of the lockup clutch. For example, a target value for the slip amount of the lockup clutch in relation to the operating condition is preliminarily stored in a storage device according to a shift position, and the coupling capacity of the lockup clutch is controlled so that an actual slip amount becomes the target value.

Further known is an engine capable of performing and stopping combustion in each cylinder group for the purpose of improving fuel economy in particular. In such an engine, there is a difference in engine output torque characteristic between an all-cylinder operating condition and a partial-cylinder operating condition due to the difference in number of cylinders, and there is also a difference in engine output characteristic between the cylinder groups due to a minute difference in machining error or assembly error.

In a vehicle having such an engine capable of performing and stopping combustion in each cylinder group, it is necessary to prevent improper determination in determining the failure of a lockup clutch or a lockup clutch control device and to control the vehicle according to whether or not the failure has been detected.

SUMMARY OF THE INVENTION

It is therefore an object of the present invention to provide a control system for a vehicle having an engine capable of performing and stopping combustion in each cylinder group which can prevent improper determination in determining the failure of a lockup clutch or a lockup clutch control device.

In accordance with an aspect of the present invention, there is provided a control system for a vehicle having an engine with a plurality of cylinders whose operating condition is switchable between an all-cylinder operating condition where all of the cylinders are operated and a partial-cylinder operating condition where a part of the cylinders is operated according to an operating condition of the vehicle, a torque converter with a lockup clutch connected to the engine, and a lockup clutch control device for controlling the lockup clutch, the control system including engine switch control means for switching the operating condition of the engine between the all-cylinder operating condition and the partial-cylinder operating condition; failure determining means for determining the failure of the lockup clutch and the lockup clutch control device; and failure determination suspending means for suspending the failure determination by the failure determining means in the case that the operating condition of the engine is switched by the engine switch control means during the failure determination by the failure determining means.

According to this aspect, the failure determination by the failure determining means is suspended in the case that the engine operating condition is switched during the failure determination by the failure determining means. In such a case where accurate failure determination is influenced, the failure determination is suspended to thereby prevent improper determination.

Preferably, the coupling capacity of the lockup clutch is changed by the lockup clutch control device in switching the operating condition of the engine by the engine switch control means. In this case, the failure determination suspending means excludes a time period for the switch control of the operating condition of the engine by the engine switch control means from the count of an operating condition detecting duration required for the failure determination by the failure determining means. By changing the coupling capacity of the lockup clutch in association with the switch control of the number of cylinders, the shock due to switching of the engine operating condition can be reduced.

In accordance with another aspect of the present invention, there is provided a control system for a vehicle having an engine with a plurality of cylinders whose operating condition is switchable between an all-cylinder operating condition where all of the cylinders are operated and a partial-cylinder operating condition where a part of the cylinders is operated according to an operating condition of the vehicle, a torque converter with a lockup clutch connected to the engine, and a lockup clutch control device for controlling the lockup clutch, the control system including engine switch control means for switching the operating condition of the engine between the all-cylinder operating condition and the partial-cylinder operating condition; failure determining means for determining the failure of the lockup clutch and the lockup clutch control device; and coupling capacity change inhibiting means for inhibiting a change in coupling capacity of the lockup clutch accompanied by the switch control of the operating condition of the engine by the engine switch control means during the failure determination by the failure determining means.

According to this aspect, the control of changing the coupling capacity of the lockup clutch which control may have an influence on the failure determination is inhibited by the coupling capacity change inhibiting means, thereby preventing improper determination in determining the failure of the lockup clutch or the lockup clutch control device and also preventing an increase in failure detection time.

In accordance with a further aspect of the present invention, there is provided a control system for a vehicle having an engine with a plurality of cylinders whose operating condition is switchable between an all-cylinder operating condition where all of the cylinders are operated and a partial-cylinder operating condition where a part of the cylinders is operated according to an operating condition of the vehicle, a torque converter with a lockup clutch connected to the engine, and a lockup clutch control device for controlling the lockup clutch, the control system including engine switch control means for switching the operating condition of the engine between the all-cylinder operating condition and the partial-cylinder operating condition; failure determining means for determining the failure of the lockup clutch and the lockup clutch control device; and switch inhibiting means for inhibiting the switch control of the operating condition of the engine by the engine switch control means during the failure determination by the failure determining means.

According to this aspect, the control of switching the number of cylinders which control may have an influence on the failure determination is inhibited by the switch inhibiting means, thereby preventing improper determination in determining the failure of the lockup clutch or the lockup clutch control device.

In accordance with a still further aspect of the present invention, there is provided a control system for a vehicle having an engine with a plurality of cylinders whose operating condition is switchable between an all-cylinder operating condition where all of the cylinders are operated and a partial-cylinder operating condition where a part of the cylinders is operated according to an operating condition of the vehicle, a torque converter with a lockup clutch connected to the engine, and a lockup clutch control device for controlling the lockup clutch, the control system including engine switch control means for switching the operating condition of the engine between the all-cylinder operating condition and the partial-cylinder operating condition; failure determining means for determining the failure of the lockup clutch and the lockup clutch control device; and forcible switching means for forcibly switching the switch inhibiting means for inhibiting the switch control of the operating condition of the engine by the engine switch control means during the failure determination by the failure determining means.

According to this aspect, in the case that the conditions for execution of the failure determination are satisfied in the partial-cylinder operating condition, the partial-cylinder operating condition is once forcibly switched to the all-cylinder operating condition, and the failure determination is then performed in the all-cylinder operating condition. Accordingly, the normality or failure of the lockup clutch can be detected with data setting and accuracy in a detection method similar to those in a conventional method.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
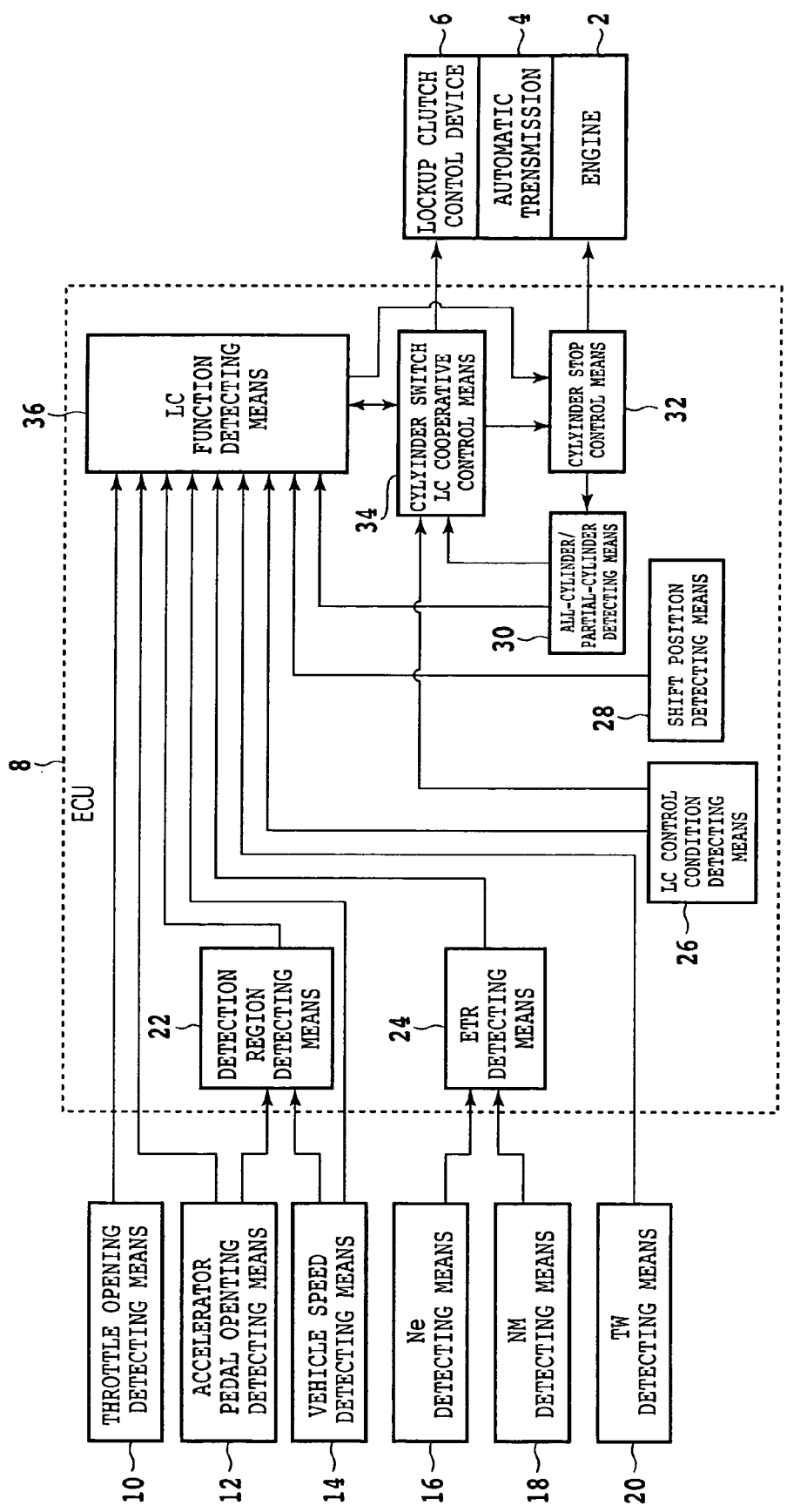
FIG. 1 is a block diagram of a control system for a vehicle according to a preferred embodiment of the present invention.

Referring to FIG. 1, there is shown a block diagram of a control system for a vehicle according to a preferred embodiment of the present invention. An automatic transmission 4 is connected to the crankshaft of an engine 2. The automatic transmission 4 has a torque converter with a lockup clutch. The lockup clutch is controlled by a lockup clutch control device 6. The engine 2 is an engine capable of performing and stopping combustion in each cylinder group. In other words, the engine 2 is an engine configured so that the cylinders of the engine are divided into a plurality of groups each consisting of a predetermined number of cylinders, wherein combustion stop control or combustion condition control by ignition timing or fuel injection amount is performed in each cylinder group. One example of such an engine is a V-type six-cylinder engine in which the above control is performed in each bank.

Figure 2:
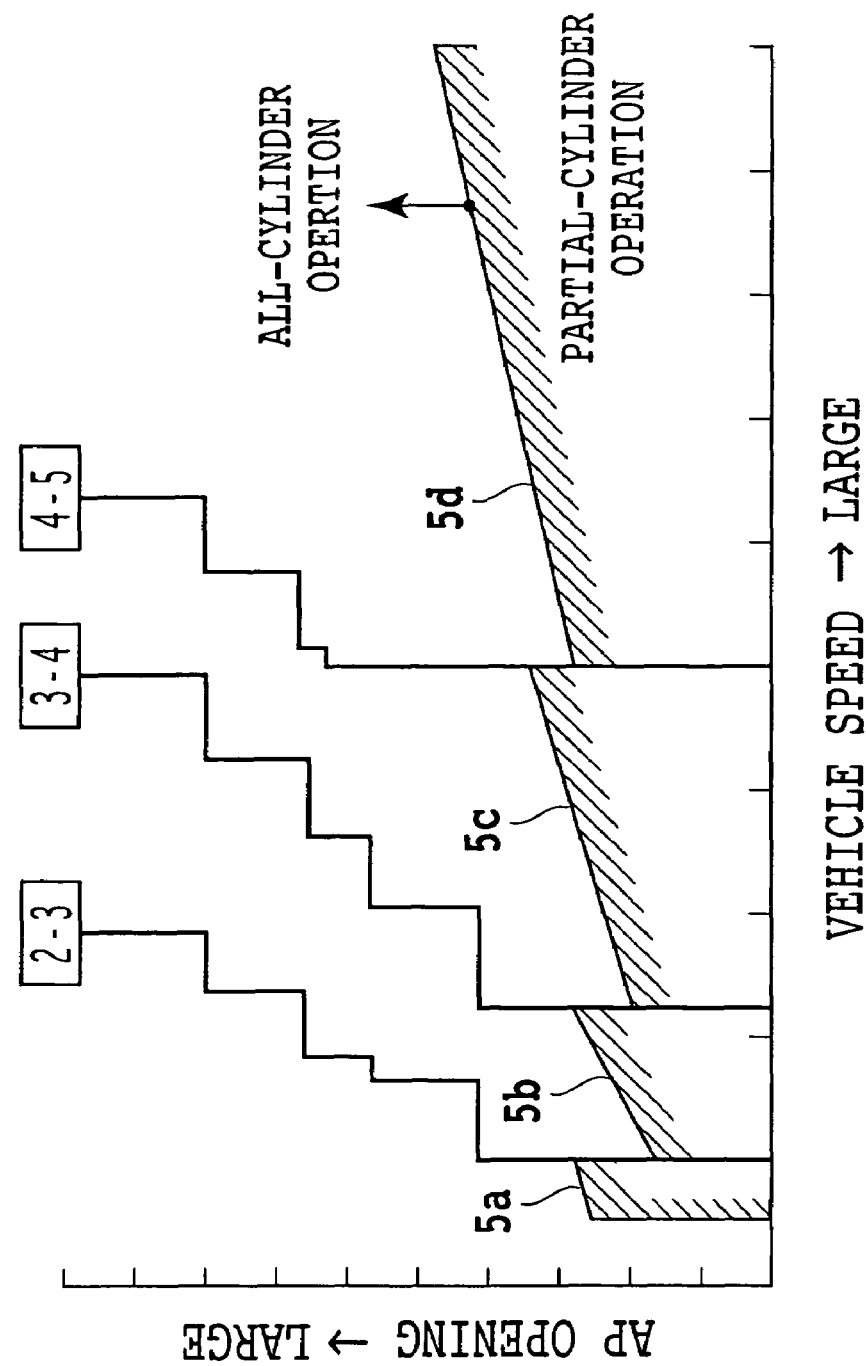
FIG. 2 is a graph showing an all-cylinder/partial-cylinder operating condition of an engine according to a vehicle speed and an accelerator pedal opening.

Referring to FIG. 2, there is shown an operating condition of the engine 2 according to a vehicle speed and an accelerator pedal opening. As shown in FIG. 2, an all-cylinder operation is performed at an accelerator pedal opening larger than the accelerator pedal opening shown by the lines 5a to 5d, and a partial-cylinder operation is performed at an accelerator pedal opening smaller than the accelerator pedal opening shown by the lines 5a to 5d. In such an engine, a single-bank operation (partial-cylinder operation) is performed in order not to reduce an output torque, but to improve fuel economy by reducing a mechanical loss due to friction or the like owing to the configuration that each bank is individually provided with intake and exhaust systems.

A throttle opening θTH in the single-bank operation is enlarged about twice that in a double-bank operation (all-cylinder operation). Accordingly, the engine output torque is not basically changed with a change in the number of banks to be operated, but is smoothly changed according to an accelerator pedal opening as an output demand.

The automatic transmission 4 has a known configuration such that it is connected to the crankshaft of the engine 2 and includes a torque converter with a lockup clutch and a multispeed shifting mechanism connected to the output side of the torque converter. The engine 2 and the automatic transmission 4 are controlled by an electronic control unit (ECU) 8 mounted on the vehicle.

The engine 2 is provided with throttle opening detecting means 10 for detecting an opening angle of a throttle valve provided in an intake pipe, and a detection signal from the throttle opening detecting means 10 is input into the ECU 8. Similarly, Ne detecting means 16 for detecting an engine speed Ne and TW detecting means 20 for detecting an engine coolant temperature TW are provided in the vicinity of the engine 2, and detection signals from the Ne detecting means 16 and the TW detecting means 20 are also input into the ECU 8. Further, accelerator pedal opening detecting means 12 for detecting an accelerator pedal depression amount (AP opening) is provided in the vicinity of the accelerator pedal, and a detection signal from the accelerator pedal opening detecting means 12 is also input into the ECU 8.

NM detecting means 18 for detecting a rotational speed NM of the main shaft of the automatic transmission 4 is provided on the input side of the automatic transmission 4, and vehicle speed detecting means 14 for detecting a vehicle speed is provided on the output side of the automatic transmission 4. Detection signals from the NM detecting means 18 and the vehicle speed detecting means 14 are also input into the ECU 8. The ECU 8 includes a central processing unit (CPU), memory devices such as ROM and RAM, and an input/output interface to perform many kinds of processing in accordance with programmed software.

Detection region detecting means 22 is provided to detect a region for detecting the failure of the lockup clutch and/or the lockup clutch control device 6 according to the accelerator pedal opening and the vehicle speed detected. ETR detecting means 24 is provided to detect the slip rate of the torque converter, or to detect ETR=NM/Ne according to the engine speed Ne and the rotational speed NM of the main shaft of the automatic transmission 4.

LC control condition detecting means 26 is provided to detect whether the lockup clutch is under the slip control or it is tightly coupled. Shift position detecting means 28 is provided to detect a shift position in the automatic transmission 4. For example, in the case that a shift lever is in a drive range (D range), the shift position detecting means 28 detects any one of the first to fifth speeds.

All-cylinder/partial-cylinder detecting means 30 is provided to detect whether the engine 2 is in the all-cylinder operating condition or in the partial-cylinder operating condition. Cylinder stop control means 32 is provided to control the engine 2 so that the all-cylinder operation is performed at an accelerator pedal opening larger than the accelerator pedal opening shown by the lines 5a to 5d in FIG. 2, whereas the partial-cylinder operation is performed at an accelerator pedal opening smaller than the accelerator pedal opening shown by the lines 5a to 5d. The cylinder stop control means 32 corresponds to engine switch control means.

Detection signals from the detection region detecting means 22, the ETR detecting means 24, the LC control condition detecting means 26, the shift position detecting means 28, and the all-cylinder/partial-cylinder detecting means 30 are input into lockup clutch function (LC function) detecting means 36. The throttle opening, the vehicle speed, and the engine coolant temperature TW detected are also input into the LC function detecting means 36.

Cylinder switch LC cooperative control means 34 is provided to control the lockup clutch control device 6 according to the all-cylinder/partial-cylinder engine operating condition on the basis of the output signals from the LC control condition detecting means 26, the all-cylinder/partial-cylinder detecting means 30, and the LC function detecting means 36.

According to the first aspect of the present invention, the LC function detecting means 36 includes failure determining means for determining the failure of the lockup clutch and the lockup clutch control device 6, and failure determination suspending means for suspending the failure determination by the failure determining means in the case that the engine operating condition is switched by the engine switch control means during the failure determination by the failure determining means.

Preferably, the coupling capacity of the lockup clutch is changed by the lockup clutch control device 6 in switching the engine operating condition by the engine switch control means. In this case, the failure determination suspending means excludes a time period for the switch control of the engine operating condition by the engine switch control means from the count of an operating condition detecting duration required for the failure determination by the failure determining means.

According to the second aspect of the present invention, the LC function detecting means 36 includes failure determining means for determining the failure of the lockup clutch and the lockup clutch control device 6, and coupling capacity change inhibiting means for inhibiting a change in coupling capacity of the lockup clutch accompanied by the switch control of the engine operating condition by the engine switch control means during the failure determination by the failure determining means.

According to the third aspect of the present invention, the LC function detecting means 36 includes failure determining means for determining the failure of the lockup clutch and the lockup clutch control device 6, and switch inhibiting means for inhibiting the switch control of the engine operating condition by the engine switch control means during the failure determination by the failure determining means.

According to the fourth aspect of the present invention, the LC function detecting means 36 includes failure determining means for determining the failure of the lockup clutch and the lockup clutch control device 6, and forcible switching means for forcibly switching the partial-cylinder operating condition to the all-cylinder operating condition in the case that the conditions for execution of the failure determination by the failure determining means are satisfied in the partial-cylinder operating condition.

Figure 3:
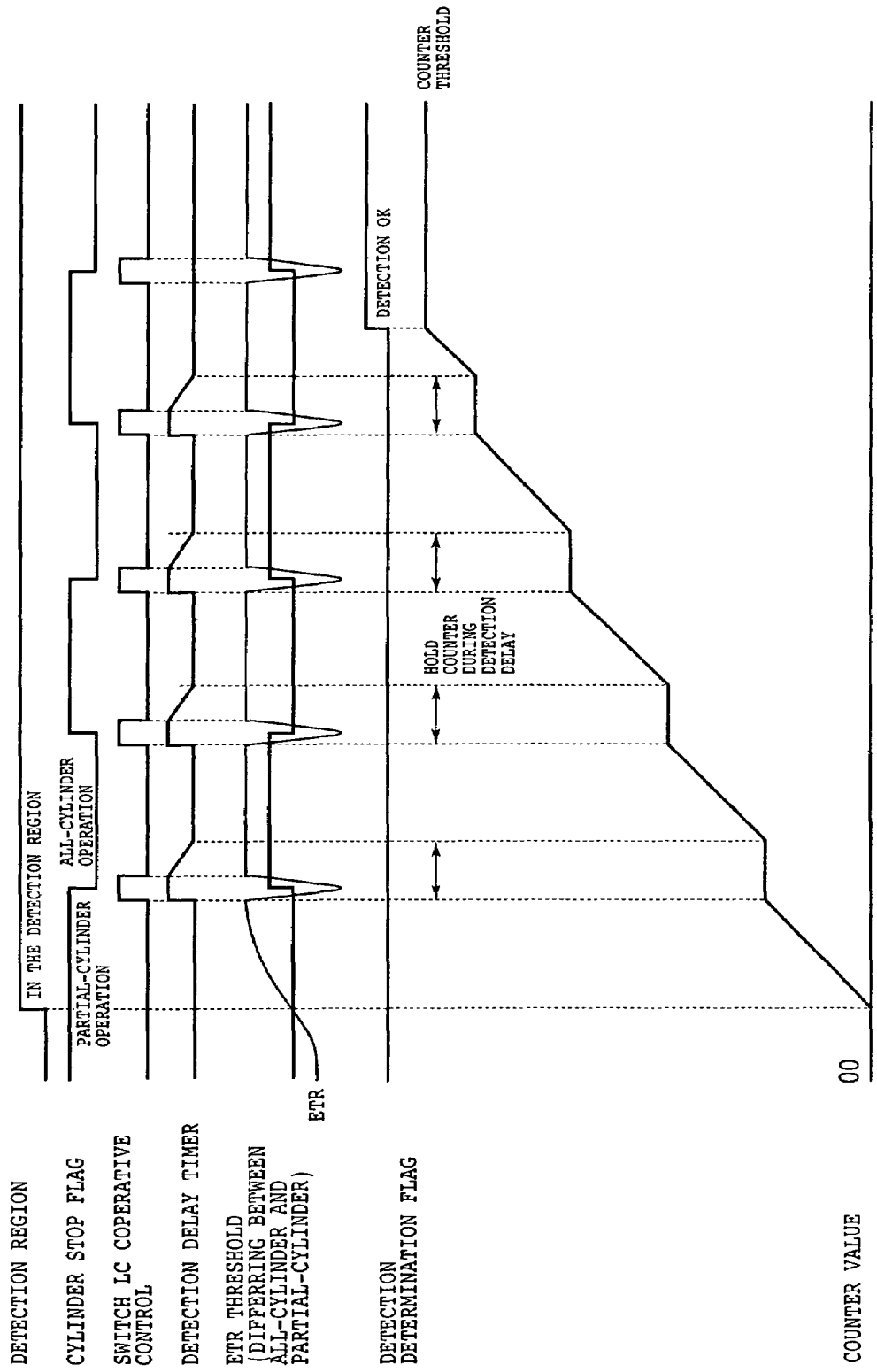
FIG. 3 is a time chart of lockup clutch normality determination according to a first preferred embodiment of the present invention.
Figure 4:
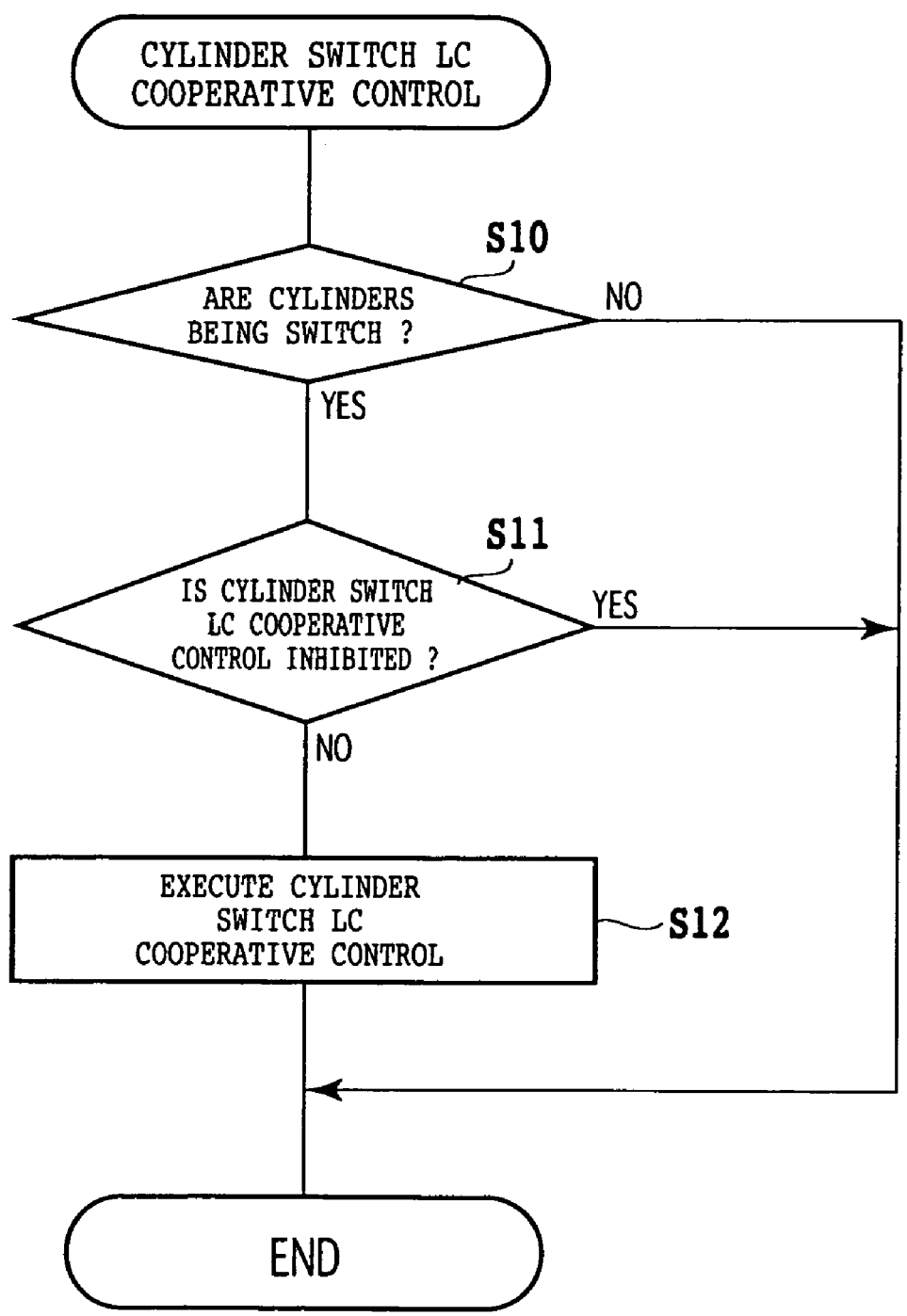
FIG. 4 is a flowchart of cylinder switch LC cooperative control.
Figure 5:
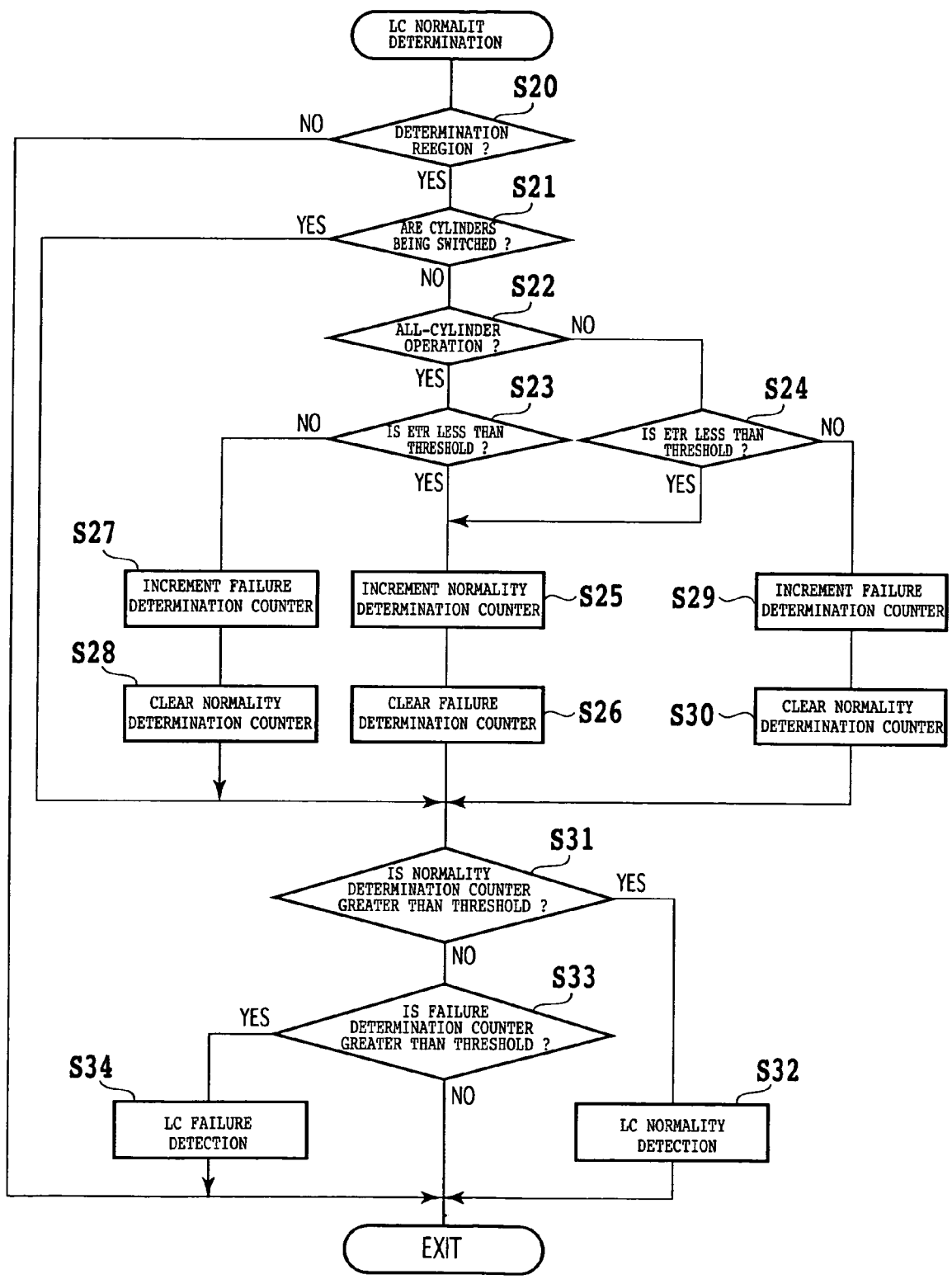
FIG. 5 is a flowchart of the LC normality determination according to the first preferred embodiment.

Referring to FIG. 3, there is shown a time chart of lockup clutch (LC) normality determination or LC abnormality determination according to a first preferred embodiment of the present invention. FIG. 4 is a flowchart of the cylinder switch LC cooperative control, and FIG. 5 is a flowchart of the LC normality determination or LC abnormality determination according to the first preferred embodiment. As shown in FIG. 3, a detection delay timer is turned on in switching between the all-cylinder operation and the partial-cylinder operation in the detection region, and the LC failure detection is suspended. When the steady state of the all-cylinder/partial-cylinder operation is reached, the LC failure detection is restarted. However, when the LC failure detection is suspended, i.e., during the detection delay, the counter is held.

According to this preferred embodiment, the cylinder switch LC cooperative control is performed during switching of the operating condition (during switching of the cylinders) to slip the lockup clutch, thereby reducing the switching shock. Accordingly, although the LC normality determination cannot be performed during switching of the cylinders, the LC normality determination can be performed in the steady state of the all-cylinder/partial-cylinder operation because an ETR threshold differs according to whether the engine is in the all-cylinder operation or the partial-cylinder operation. In other words, the cylinder switching shock can be reduced and the LC normality determination can be performed according to this preferred embodiment.

The operation of the cylinder switch LC cooperative control means 34 will now be described with reference to FIG. 4. In step S10, it is determined whether or not the cylinders are being switched. If the cylinders are not being switched, the program is ended. If the cylinders are being switched, the program proceeds to step S11 to determine whether or not the cylinder switch LC cooperative control is inhibited. If the cylinder switch LC cooperative control is inhibited, the program is ended. If the cylinder switch LC cooperative control is not inhibited, the program proceeds to step S12 to execute the cylinder LC cooperative control.

The LC normality determination according to the first preferred embodiment shown in FIG. 3 will now be described with reference to FIG. 5. In step S20, it is determined whether or not the operating condition of the vehicle is in the detection region defined according to the vehicle speed and the throttle opening. If the operating condition of the vehicle is not in the detection region, the program is ended. If the operating condition of the vehicle is in the detection region, the program proceeds to step S21 to determine whether or not the cylinders are being switched. If the cylinders are not being switched, the program proceeds to step S22 to determine whether or not the engine is in the all-cylinder operation. If the engine is in the all-cylinder operation, the program proceeds to step S23 to determine whether or not the ETR is less than the threshold.

If the engine is not in the all-cylinder operation, that is, if the engine is in the partial-cylinder operation, the program proceeds to step S24 to determine whether or not the ETR is less than the threshold. In this preferred embodiment, the ETR threshold differs according to whether the engine is in the all-cylinder operation or the partial-cylinder operation as mentioned above. Accordingly, the ETR threshold in step S23 is different from the ETR threshold in step S24. More specifically, the ETR threshold in the all-cylinder operation is set slightly higher than the ETR threshold in the partial-cylinder operation. If the ETR is less than the threshold in step S23 or S24, a normality determination counter is incremented (step S25) and a failure determination counter is cleared (step S26).

If the ETR is not less than the threshold in step S23, the failure determination counter is incremented (step S27) and the normality determination counter is cleared (step S28). Similarly, if the ETR is not less than the threshold in step S24, the failure determination counter is incremented (step S29) and the normality determination counter is cleared (step S30). After the failure determination counter is cleared in step S26 or the normality determination counter is cleared in step S28 or S30 or if the cylinders are being switched in step S21, the program proceeds to step S31 to determine whether or not the normality determination counter is greater than a normality threshold.

If the normality determination counter is greater than the normality threshold, it is meant that the normality of the lockup clutch has been detected (step S32). If the answer in step S31 is negative, the program proceeds to step S33 to determine whether or not the failure determination counter is greater than a failure threshold. If the failure determination counter is greater than the failure threshold, it is meant that the failure of the lockup clutch has been detected (step S34).

Figure 6:
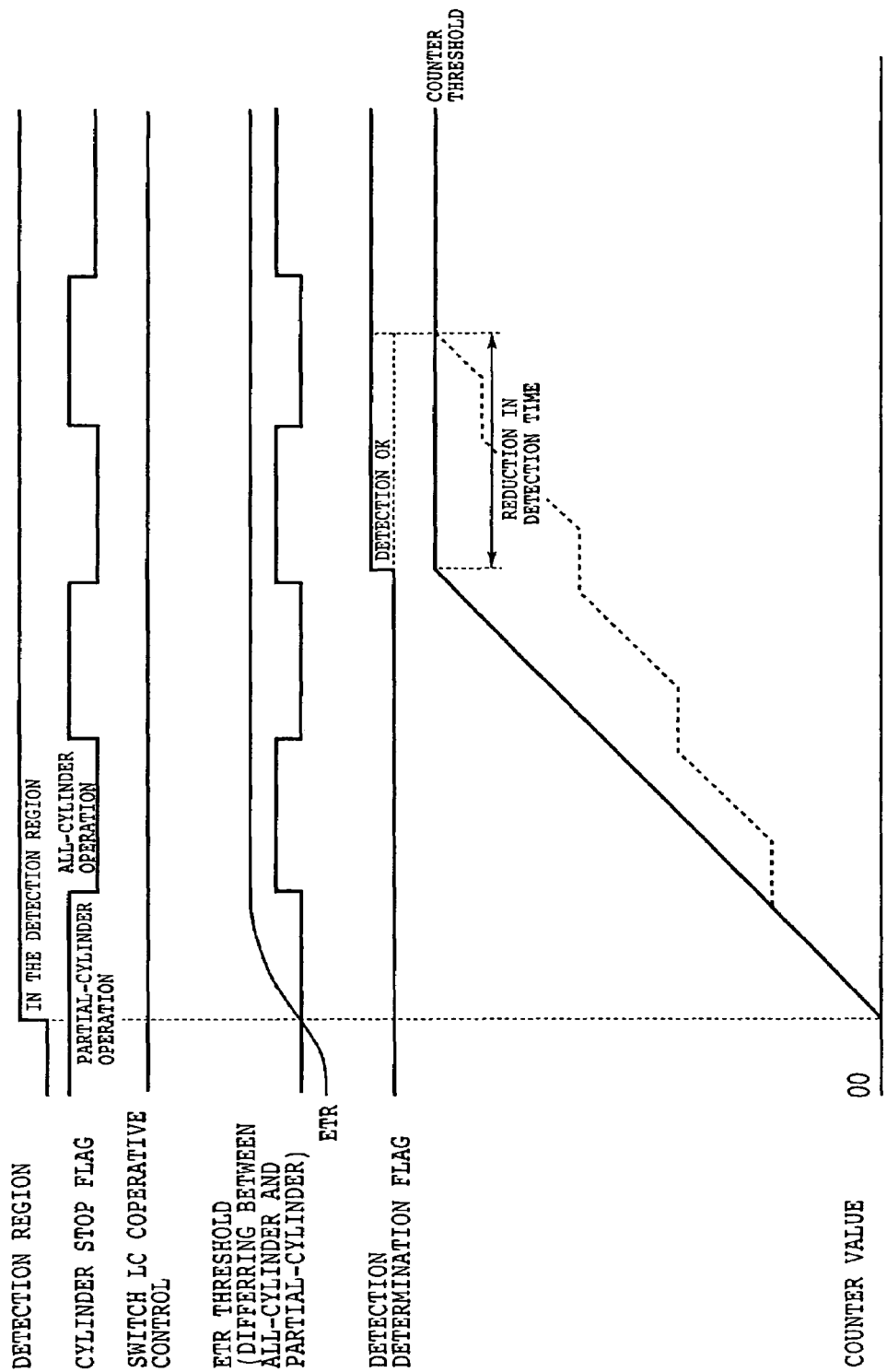
FIG. 6 is a time chart of LC normality determination according to a second preferred embodiment of the present invention.
Figure 7:
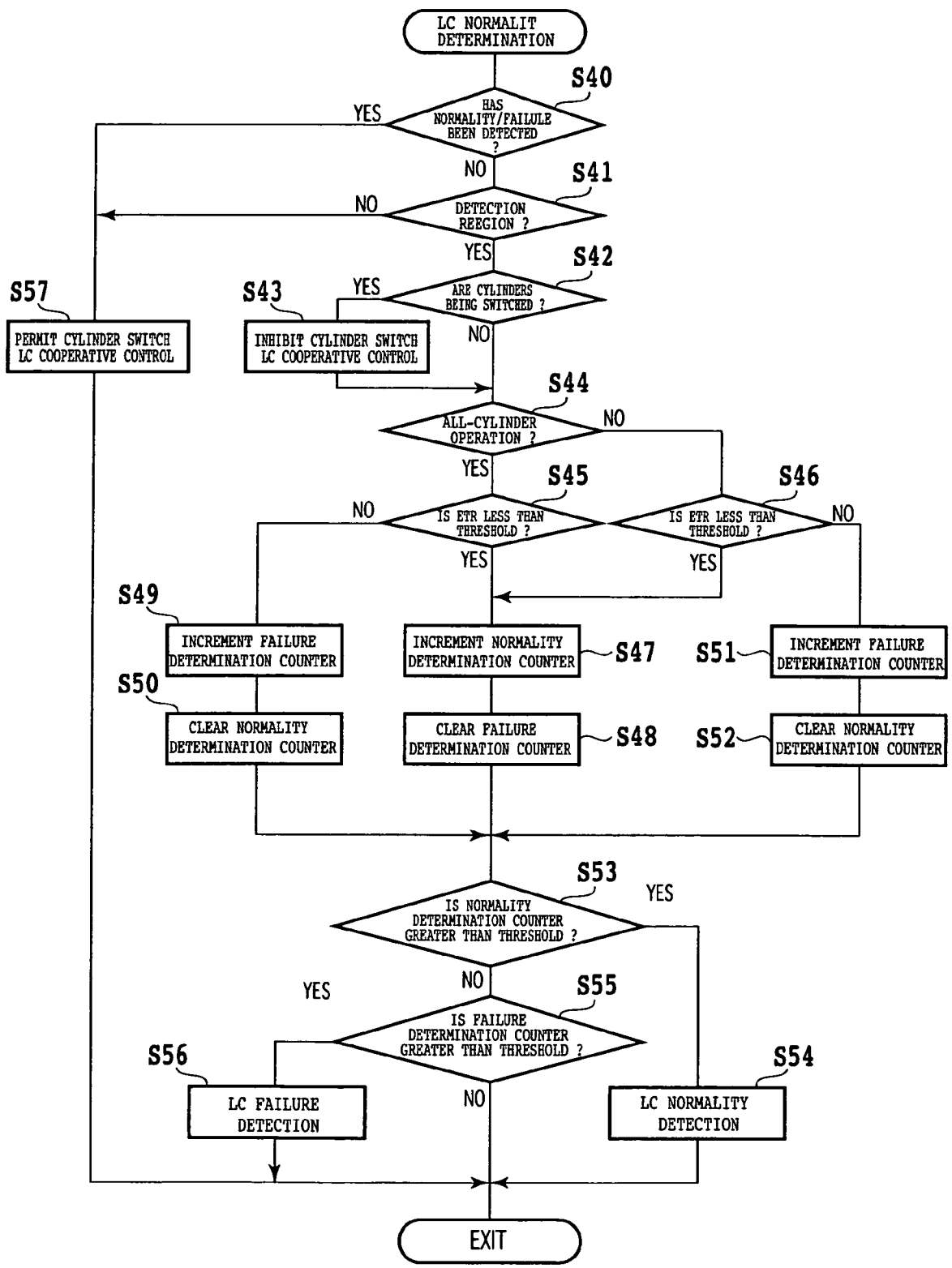
FIG. 7 is a flowchart of the LC normality determination according to the second preferred embodiment.

FIG. 6 is a time chart of lockup clutch normality determination according to a second preferred embodiment of the present invention, and FIG. 7 is a flowchart of the lockup clutch normality determination according to the second preferred embodiment. The lockup clutch normality determination according to the second preferred embodiment is characterized in that the cooperative control by the cylinder switch LC cooperative control means 34 is not performed during the LC failure determination. That is, the LC failure determination is continued without performing the cylinder switch LC cooperative control, thereby allowing the execution of the LC normality determination in a short time.

The LC normality determination according to the second preferred embodiment will now be described with reference to FIG. 7. In step S40, it is determined whether or not the LC normality/failure has already been detected. If the LC normality/failure has not been detected, the program proceeds to step S41 to determine whether or not the operating condition of the vehicle is in the detection region. If the operating condition of the vehicle is in the detection region, the program proceeds to step S42 to determine whether or not the cylinders are being switched. If the cylinders are not being switched, the program proceeds to step S44, whereas if the cylinders are being switched, the cylinder switch LC cooperative control is inhibited in step S43, and the program next proceeds to step S44. In step S44, it is determined whether or not the engine is in the all-cylinder operation.

If the engine is in the all-cylinder operation, the program proceeds to step S45 to determine whether or not the ETR is less than the threshold. If the engine is not in the all-cylinder operation in step 44, that is, if the engine is in the partial-cylinder operation, the program proceeds to step S46 to determine whether or not the ETR is less than the threshold. In this preferred embodiment, the ETR threshold differs according to whether the engine is in the all-cylinder operation or the partial-cylinder operation as shown in FIG. 6. Accordingly, the ETR threshold in step S45 is different from the ETR threshold in step S46. More specifically, the ETR threshold in the all-cylinder operation is set slightly higher than the ETR threshold in the partial-cylinder operation.

If the ETR is less than the threshold in step S45 or S46, the normality determination counter is incremented (step S47) and the failure determination counter is cleared (step S48). If the ETR is not less than the threshold in step S45, the failure determination counter is incremented (step S49) and the normality determination counter is cleared (step S50). Similarly, if the ETR is not less than the threshold in step S46, the failure determination counter is incremented (step S51) and the normality determination counter is cleared (step S52).

After the failure determination counter is cleared in step S48 or the normality determination counter is cleared in step S50 or S52, the program proceeds to step S53 to determine whether or not the normality determination counter is greater than a normality threshold. If the normality determination counter is greater than the normality threshold, it is meant that the normality of the lockup clutch has been detected (step S54).

If the answer in step S53 is negative, the program proceeds to step S55 to determine whether or not the failure determination counter is greater than a failure threshold. If the failure determination counter is greater than the failure threshold, it is meant that the failure of the lockup clutch has been detected (step S56). If the LC normality/failure has already been detected in step S40 or the operating condition of the vehicle is not in the detection region in step S41, the program proceeds to step S57 to permit the cylinder switch LC cooperative control and is next ended.

Figure 8:
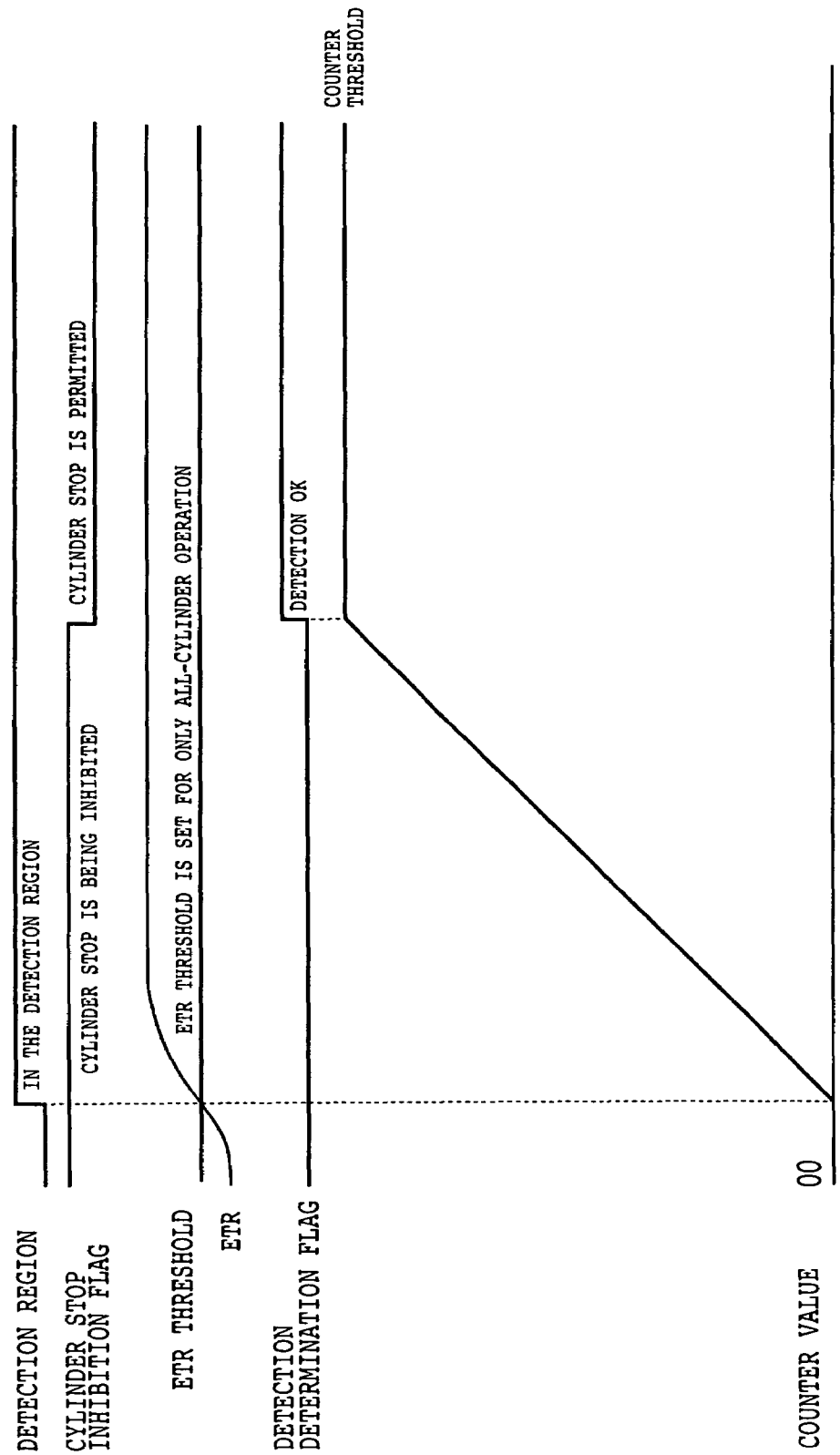
FIG. 8 is a time chart of LC normality determination according to a third preferred embodiment of the present invention.
Figure 9:
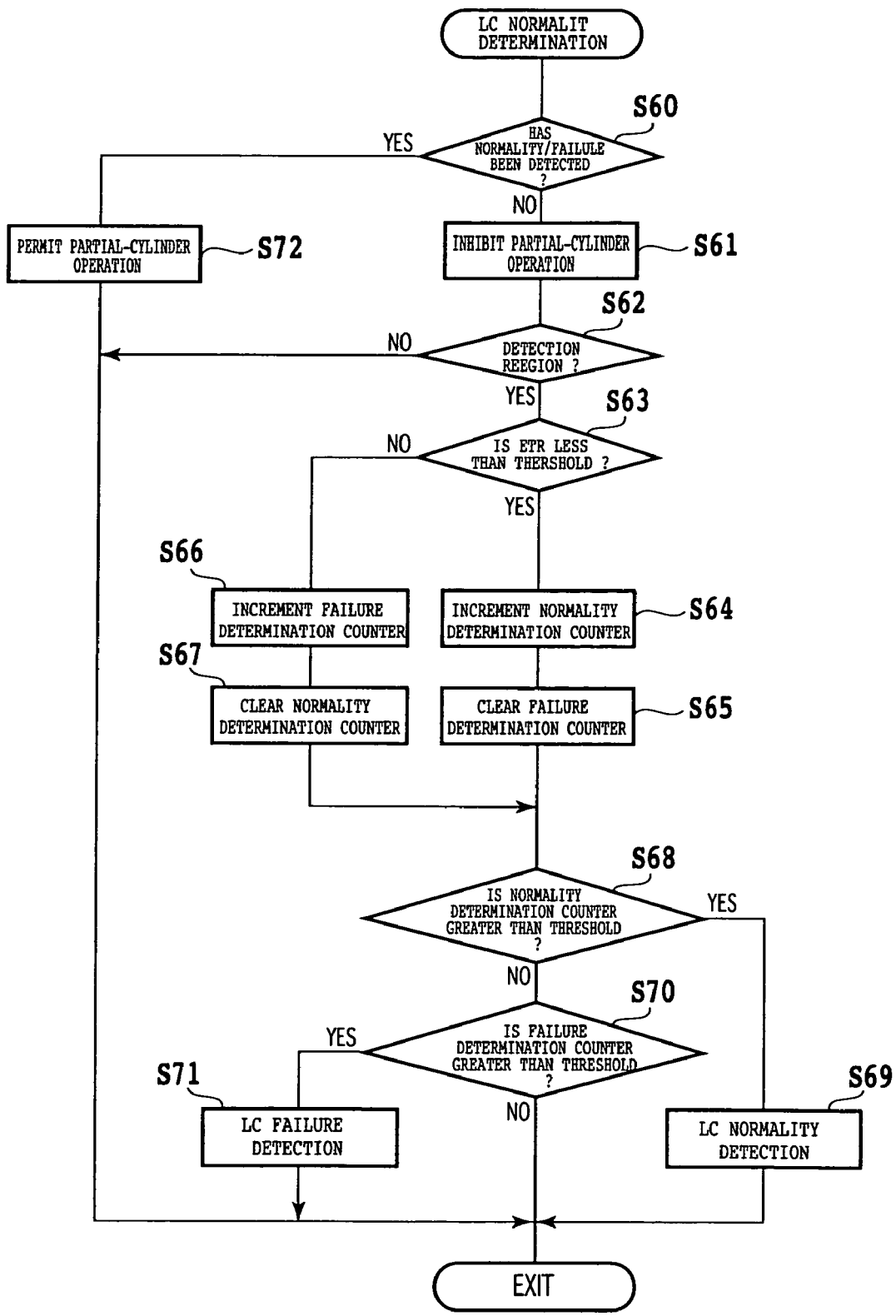
FIG. 9 is a flowchart of the LC normality determination according to the third preferred embodiment.

FIG. 8 is a time chart of lockup clutch normality determination according to a third preferred embodiment of the present invention, and FIG. 9 is a flowchart of the lockup clutch normality determination according to the third preferred embodiment. The lockup clutch normality determination according to the third preferred embodiment is characterized in that the partial-cylinder operation is inhibited until the LC normality/failure is detected. In other words, the LC normality determination is performed in only the all-cylinder operation. Therefore, the LC normality/failure can be detected by a detection method and accuracy similar to those in the case of an engine with a fixed number of operating cylinders.

The LC normality determination according to the third preferred embodiment will now be described with reference to FIG. 9. In step S60, it is determined whether or not the LC normality/failure has already been detected. If the LC normality/failure has not been detected, the program proceeds to step S61 to inhibit the partial-cylinder operation. The program next proceeds to step S62 to determine whether or not the operating condition of the vehicle is in the detection region. If the operating condition of the vehicle is in the detection region, the program proceeds to step S63 to determine whether or not the ETR is less than the threshold. As apparent from FIG. 8, the ETR threshold in this preferred embodiment is set for only the all-cylinder operation.

If the ETR is less than the threshold in step S63, the normality determination counter is incremented (step S64) and the failure determination counter is cleared (step S65). If the ETR is not less than the threshold in step S63, the failure determination counter is incremented (step S66) and the normality determination counter is cleared (step S67). After the failure determination counter is cleared in step S65 or the normality determination counter is cleared in step S67, the program proceeds to step S68 to determine whether or not the normality determination counter is greater than a normality threshold. If the normality determination counter is greater than the normality threshold, it is meant that the normality of the lockup clutch has been detected (step S69).

If the answer in step S68 is negative, the program proceeds to step S70 to determine whether or not the failure determination counter is greater than a failure threshold. If the failure determination counter is greater than the failure threshold, it is meant that the failure of the lockup clutch has been detected (step S71). If the LC normality/failure has already been detected in step S60, the program proceeds to step S72 to permit the switching to the partial-cylinder operation according to the operating condition of the vehicle, and is next ended. Further, if the operating condition of the vehicle is not in the detection region in step S62, the program is ended.

Figure 10:
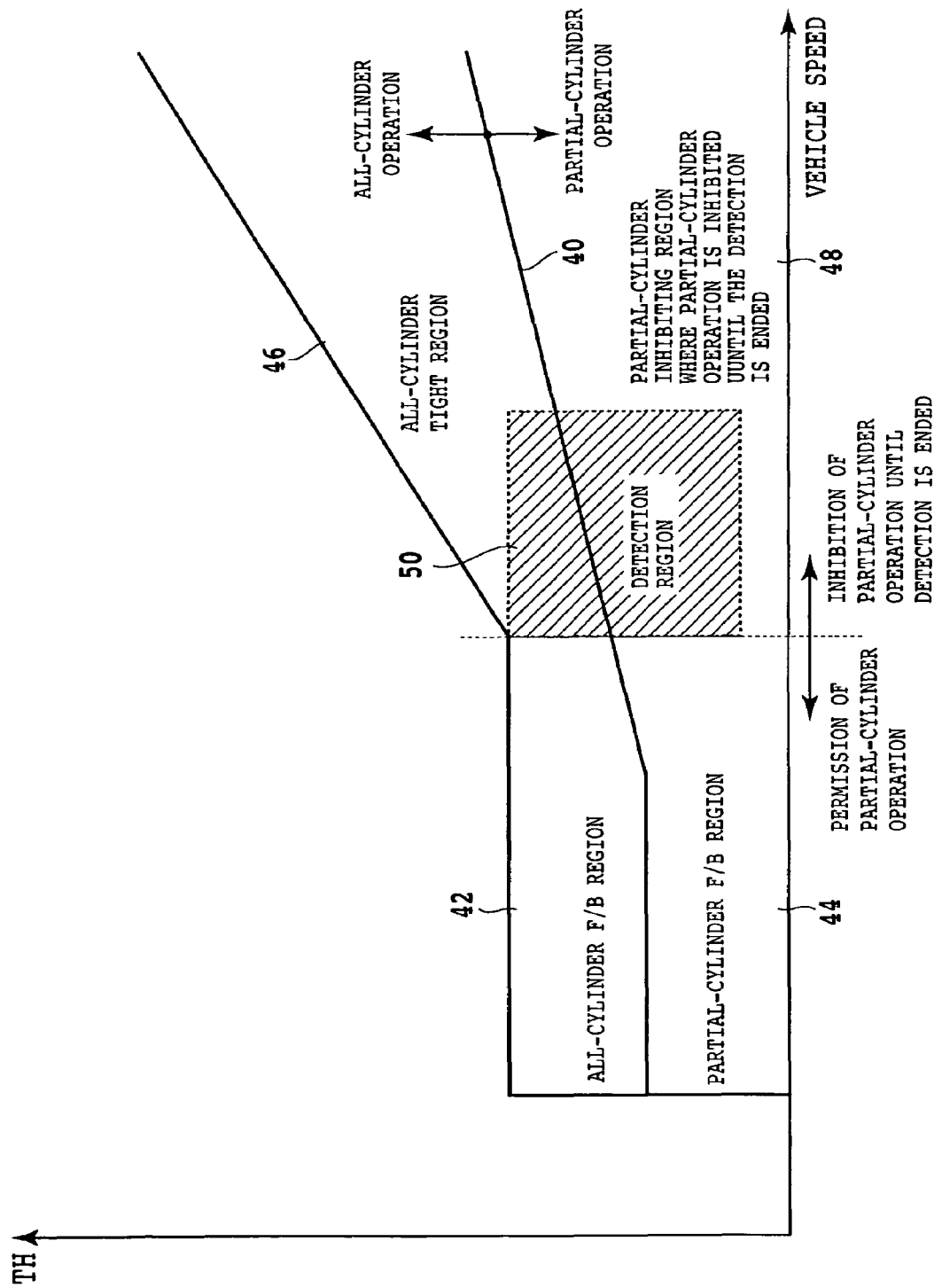
FIG. 10 is a graph for illustrating a vehicle control method according to a fourth preferred embodiment of the present invention.

FIG. 10 is a graph for illustrating a vehicle control method using a vehicle speed and a throttle opening according to a fourth preferred embodiment of the present invention. Referring to FIG. 10, the all-cylinder operation is performed in a throttle opening region above the line 40, and the partial-cylinder operation is performed below the line 40. Reference numerals 42, 44, and 46 denote an all-cylinder feedback region, a partial-cylinder feedback region, and an all-cylinder tight region, respectively. Further, reference numeral 48 denotes a partial-cylinder inhibiting region where the partial-cylinder operation is inhibited until the detection of the LC normality/failure is ended.

Reference numeral 50 denotes a detection region defined by a predetermined vehicle speed and a predetermined throttle opening. When the vehicle operating condition is in the detection region 50, the detection of the LC normality/failure is performed. The predetermined vehicle speed is in the range of 80 to 120 km/h, for example, and the predetermined throttle opening is in the range of 0.3/8 to 2.0/8, for example.

In the region 48 where the vehicle speed is higher than that in the detection region 50, the partial-cylinder operation is inhibited until the detection is ended. Accordingly, the LC normality determination can be performed in only the all-cylinder operation, so that the detection can be performed with the accuracy similar to that in the conventional engine when the vehicle speed is higher than that in the detection region 50. Further, when the vehicle speed is lower than that in the detection region 50, the partial-cylinder operation is permitted according to the throttle opening, so that fuel economy can be improved.

Figure 11:
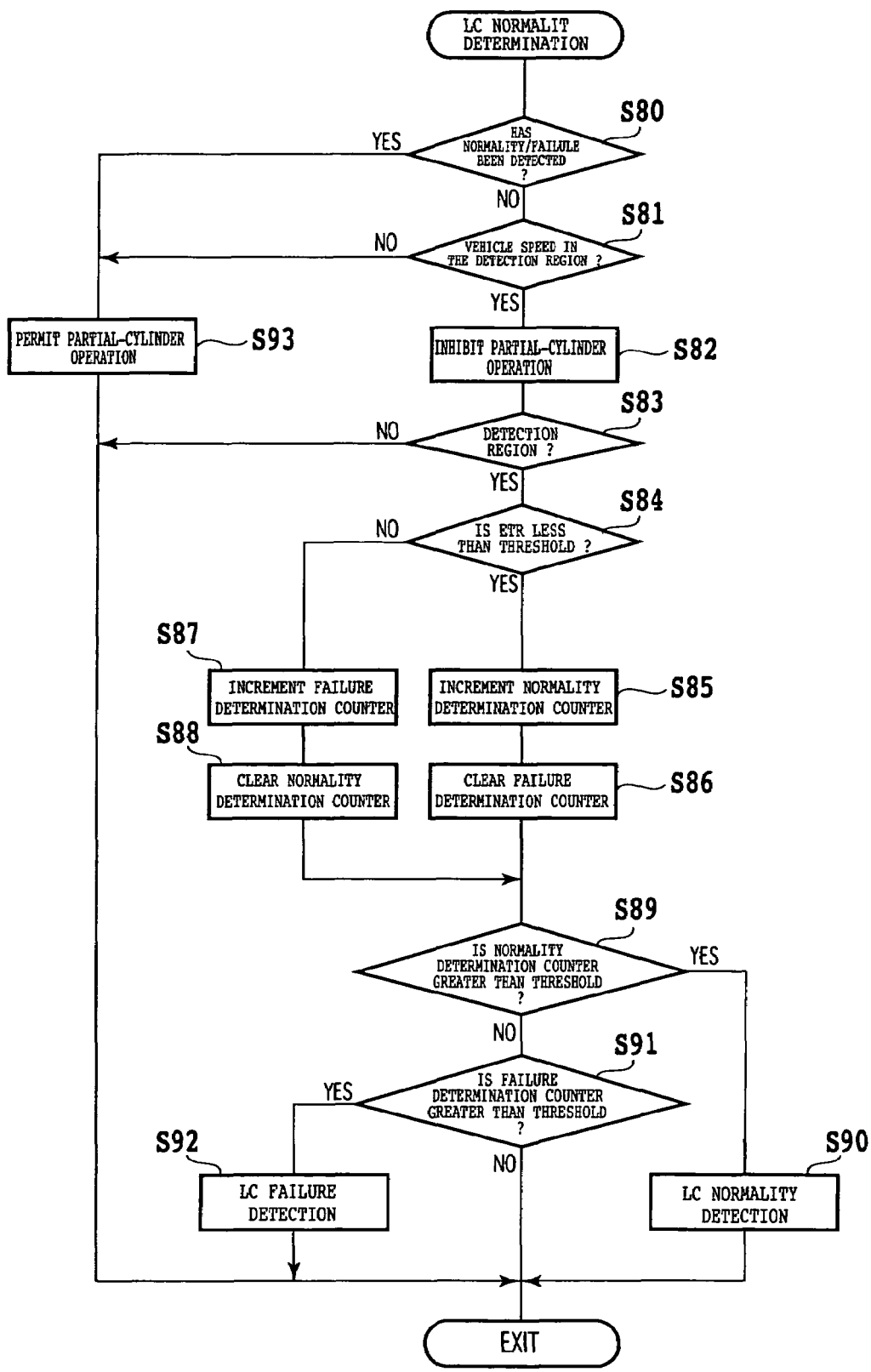
FIG. 11 is a flowchart of the LC normality determination according to the fourth preferred embodiment.

The LC normality determination according to the fourth preferred embodiment will now be described with reference to FIG. 11. In step S80, it is determined whether or not the LC normality/failure has already been detected. If the LC normality/failure has not been detected, the program proceeds to step S81 to determine whether or not the vehicle speed is higher than that in the detection region 50. If the vehicle speed is higher than that in the detection region 50, the program proceeds to step S82 to inhibit the partial-cylinder operation. The program next proceeds to step S83 to determine whether or not the operating condition of the vehicle is in the detection region 50.

If the operating condition of the vehicle is in the detection region 50, the program proceeds to step S84 to determine whether or not the ETR is less than the threshold. If the ETR is less than the threshold, the normality determination counter is incremented (step S85) and the failure determination counter is cleared (step S86). If the ETR is not less than the threshold, the failure determination counter is incremented (step S87) and the normality determination counter is cleared (step S88).

After the failure determination counter is cleared in step S86 or the normality determination counter is cleared in step S88, the program proceeds to step S89 to determine whether or not the normality determination counter is greater than a normality threshold. If the normality determination counter is greater than the normality threshold, it is meant that the normality of the lockup clutch has been detected (step S90).

If the answer in step S89 is. negative, the program proceeds to step S91 to determine whether or not the failure determination counter is greater than a failure threshold. If the failure determination counter is greater than the failure threshold, it is meant that the failure of the lockup clutch has been detected (step S92). If the LC normality/failure has already been detected in step S80 or the vehicle speed is lower than that in the detection region 50 in step S81, the program proceeds to step S93 to permit the partial-cylinder operation according to the throttle opening, and is next ended. Further, if the operating condition of the vehicle is not in the detection region 50 in step S83, the program is ended.

Figure 12:
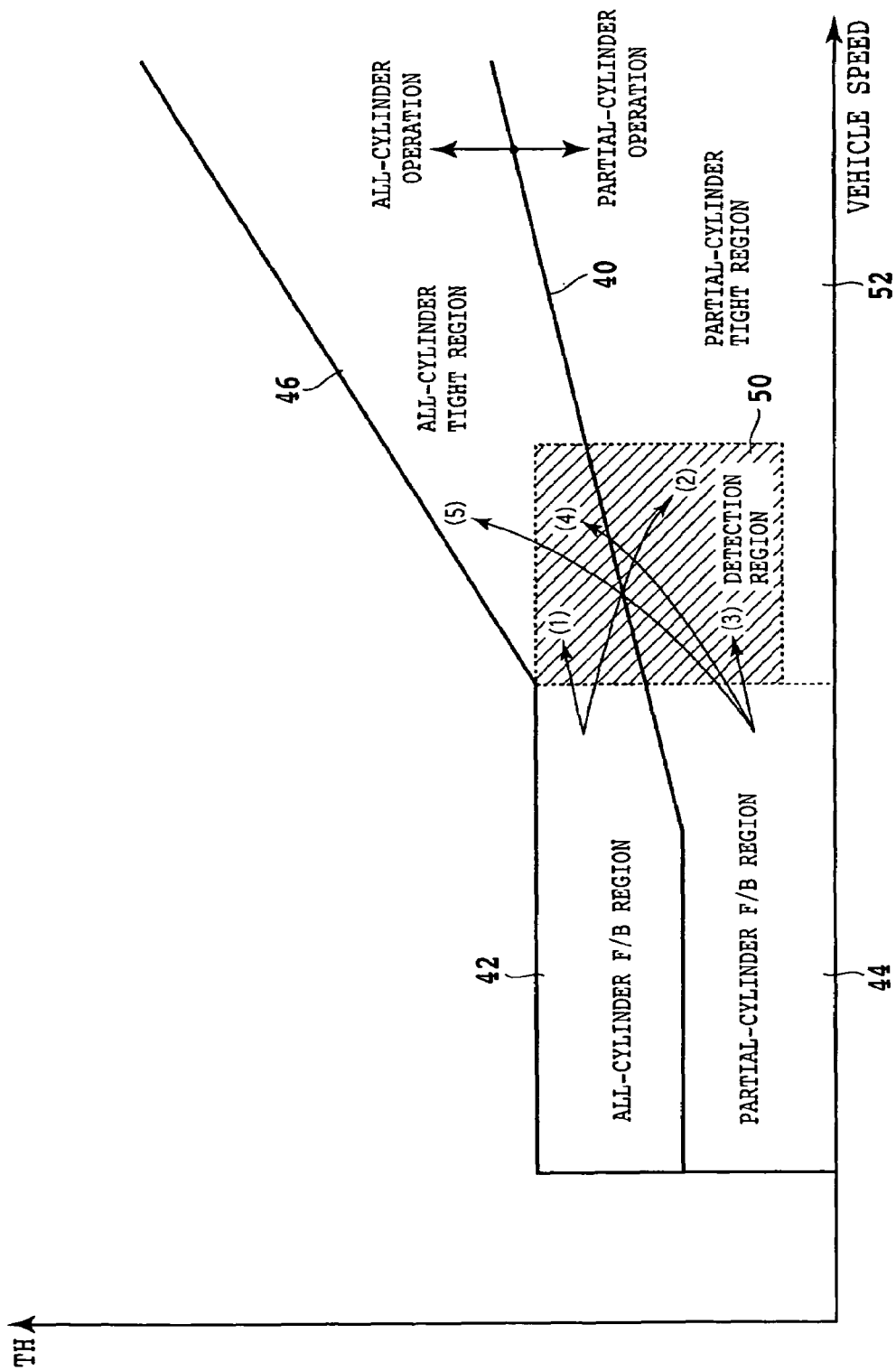
FIG. 12 is a graph for illustrating a vehicle control method according to a fifth preferred embodiment of the present invention.

FIG. 12 is a graph for illustrating a vehicle control method using a vehicle speed and a throttle opening according to a fifth preferred embodiment of the present invention. The same regions as those shown in FIG. 10 according to the fourth preferred embodiment are denoted by the same reference numerals. The partial-cylinder inhibiting region 48 shown in FIG. 10 has been changed into a partial-cylinder tight region 52 in the fifth preferred embodiment.

The LC normality determination according to the fifth preferred embodiment is characterized in that when the vehicle operating condition enters the detection region 50 during the all-cylinder operation, the all-cylinder operation is retained until the vehicle operating condition comes out of the detection region 50, whereas when the vehicle operating condition enters the detection region 50 during the partial-cylinder operation, the partial-cylinder operation is retained until the vehicle operating condition comes out of the detection region 50. In other words, the cylinder switch LC cooperative control is not performed, but the detection is continued to thereby perform the LC normality/failure determination in a short time.

Referring to FIG. 12, the arrow (1) shows the case that the vehicle operating condition enters the detection region 50 during the all-cylinder operation, and the detection is performed in the all-cylinder operation; the arrow (2) shows the case that the vehicle operating condition enters the detection region 50 during the all-cylinder operation and next enters the partial-cylinder region, however continuing the all-cylinder operation to perform the detection in the all-cylinder operation; the arrow (3) shows the case that the vehicle operating condition enters the detection region 50 during the partial-cylinder operation, and the detection is performed in the partial-cylinder operation; the arrow (4) shows the case that the vehicle operating condition enters the detection region 50 during the partial-cylinder operation and next enters the all-cylinder region, however continuing the partial-cylinder operation to perform the detection in the partial-cylinder operation; and the arrow (5) shows the case that the vehicle operating condition enters the detection region 50 during the partial-cylinder operation and next enters the all-cylinder region, however continuing the partial-cylinder operation to perform the detection in the partial-cylinder operation, thereafter coming out of the detection region 50, so that the partial-cylinder operation is switched to the all-cylinder operation.

Figure 13:
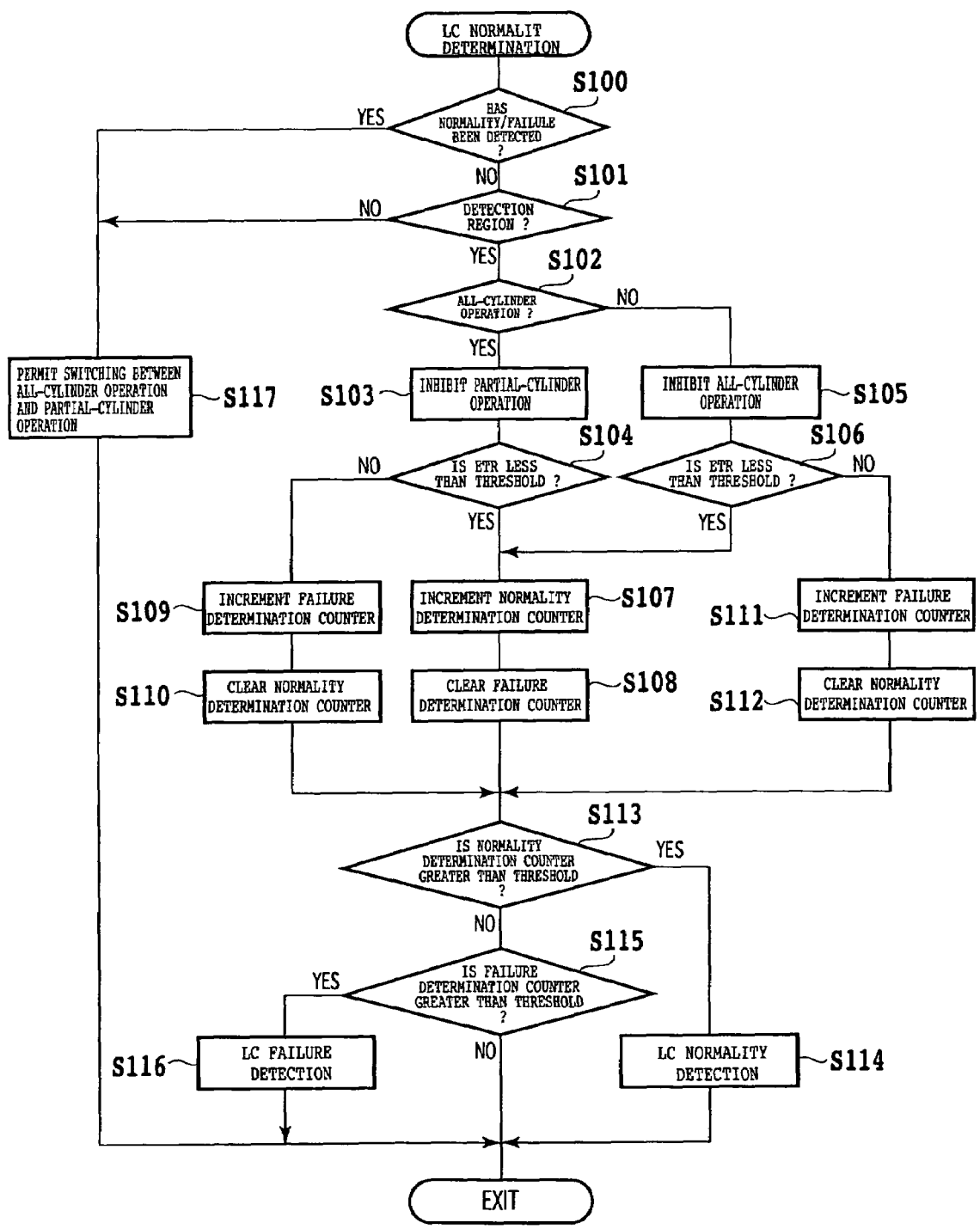
FIG. 13 is a flowchart of the LC normality determination according to the fifth preferred embodiment.

The LC normality determination according to the fifth preferred embodiment will now be described with reference to FIG. 13. In step S100, it is determined whether or not the LC normality/failure has already been detected. If the LC normality/failure has not been detected, the program proceeds to step S101 to determine whether or not the operating condition of the vehicle is in the detection region 50. If the operating condition of the vehicle is in the detection region 50, the program proceeds to step S102 to determine whether or not the engine is in the all-cylinder operation. If the engine is in the all-cylinder operation, the program proceeds to step S103 to inhibit the partial-cylinder operation, whereas if the engine is in the partial-cylinder operation in step S102, the program proceeds to step S105 to inhibit the all-cylinder operation.

After inhibiting the partial-cylinder operation in step S103, the program proceeds to step S104 to determine whether or not the ETR is less than the threshold. Similarly, after inhibiting the all-cylinder operation in step S105, the program proceeds to step S106 to determine whether or not the ETR is less than the threshold. If the ETR is less than the threshold in step S104 or S106, the normality determination counter is incremented (step S107) and the failure determination counter is cleared (step S108).

If the ETR is not less than the threshold in step S104, the failure determination counter is incremented (step S109) and the normality determination counter is cleared (step S110). Similarly, if the ETR is not less than the threshold in step S106, the failure determination counter is incremented (step S111) and the normality determination counter is cleared (step S112). After clearing the failure determination counter in step S108 or clearing the normality determination counter in step S110 or S112, the program proceeds to step S113 to determine whether or not the normality determination counter is greater than a normality threshold. If the normality determination counter is greater than the normality threshold, it is meant that the normality of the lockup clutch has been detected (step S114).

If the answer in step S113 is negative, the program proceeds to step S115 to determine whether or not the failure determination counter is greater than a failure threshold. If the failure determination counter is greater than the failure threshold, it is meant that the failure of the lockup clutch has been detected (step S116). If the LC normality/failure has already been detected in step S100 or the operating condition of the vehicle is not in the detection region 50 in step S101, the program proceeds to step S117 to permit the switching between the all-cylinder operation and the partial-cylinder operation, and is next ended.

Figure 14:
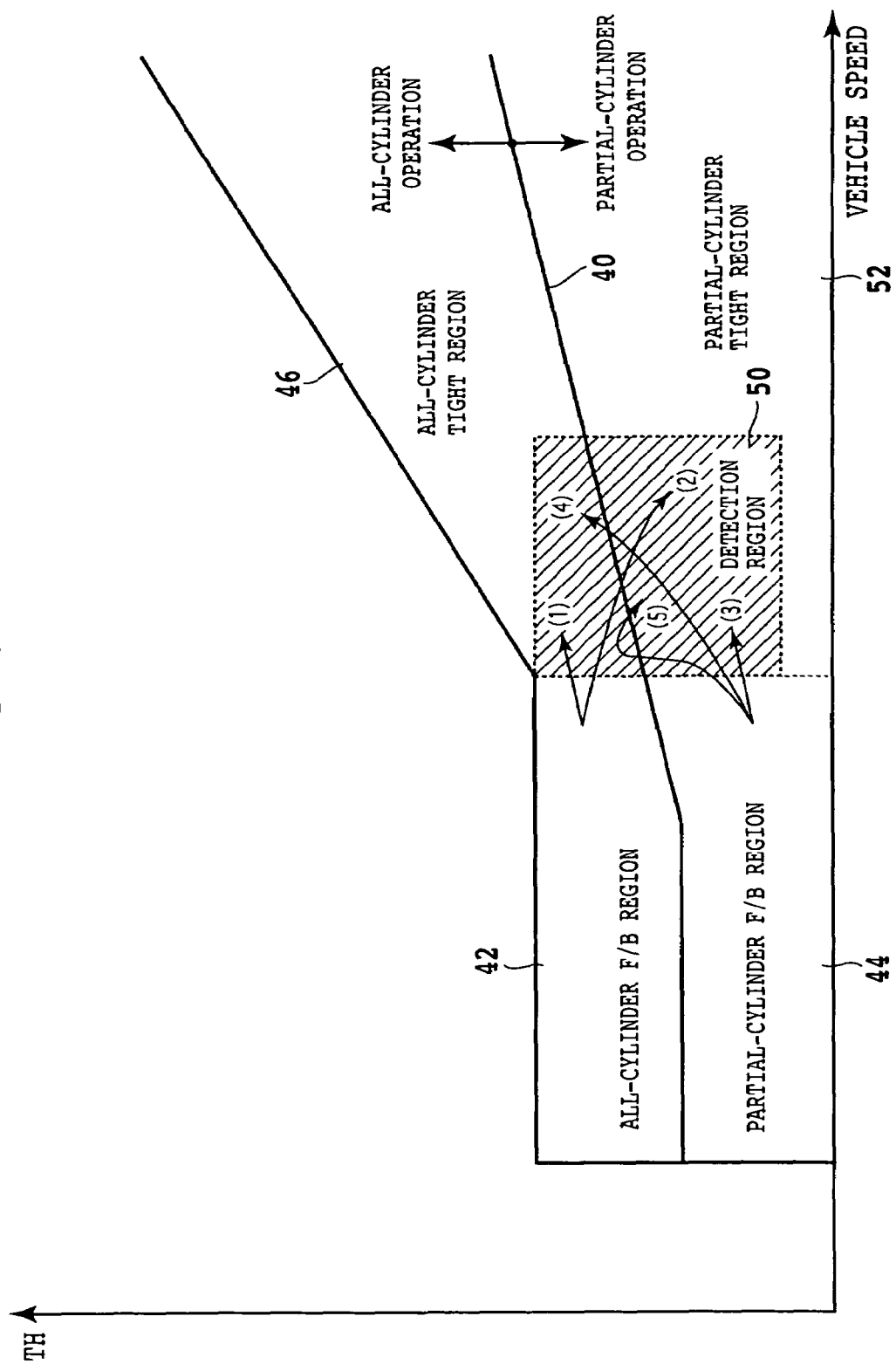
FIG. 14 is a graph for illustrating a vehicle control method according to a sixth preferred embodiment of the present invention.

FIG. 14 is a graph for illustrating a vehicle control method using a vehicle speed and a throttle opening according to a sixth preferred embodiment of the present invention. The LC normality determination according to the sixth preferred embodiment is characterized in that when the vehicle operating condition enters the detection region 50 during the all-cylinder operation, the all-cylinder operation is retained until the vehicle operating condition comes out of the detection region 50, whereas when the vehicle operating condition enters the detection region 50 during the partial-cylinder operation, the partial-cylinder operation is once changed to the all-cylinder operation. According to this preferred embodiment, the LC normality/failure determination is performed during only the all-cylinder operation, so that the normality/failure of the lockup clutch can be detected by a detection method and accuracy similar to those in the conventional engine.

Referring to FIG. 14, the arrow (1) shows the case that the vehicle operating condition enters the detection region 50 during the all-cylinder operation, and the detection is performed in the all-cylinder operation; the arrow (2) shows the case that the vehicle operating condition enters the detection region 50 during the all-cylinder operation and next enters the partial-cylinder region, however continuing the all-cylinder operation to perform the detection in the all-cylinder operation; the arrow (3) shows the case that the vehicle operating condition enters the detection region 50 during the partial-cylinder operation, and the partial-cylinder operation is once changed to the all-cylinder operation in the partial-cylinder region to perform the detection in the all-cylinder operation; the arrow (4) shows the case that the vehicle operating condition enters the detection region 50 during the partial-cylinder operation, and the partial-cylinder operation is once changed to the all-cylinder operation in the all-cylinder region to perform the detection in the all-cylinder operation; and the arrow (5) shows the case that the vehicle operating condition enters the detection region 50 during the partial-cylinder operation, and the partial-cylinder operation is once changed to the all-cylinder operation, thereafter the vehicle operating condition coming out of the partial-cylinder region and next entering the partial-cylinder region to perform the detection in the all-cylinder operation.

Figure 15:
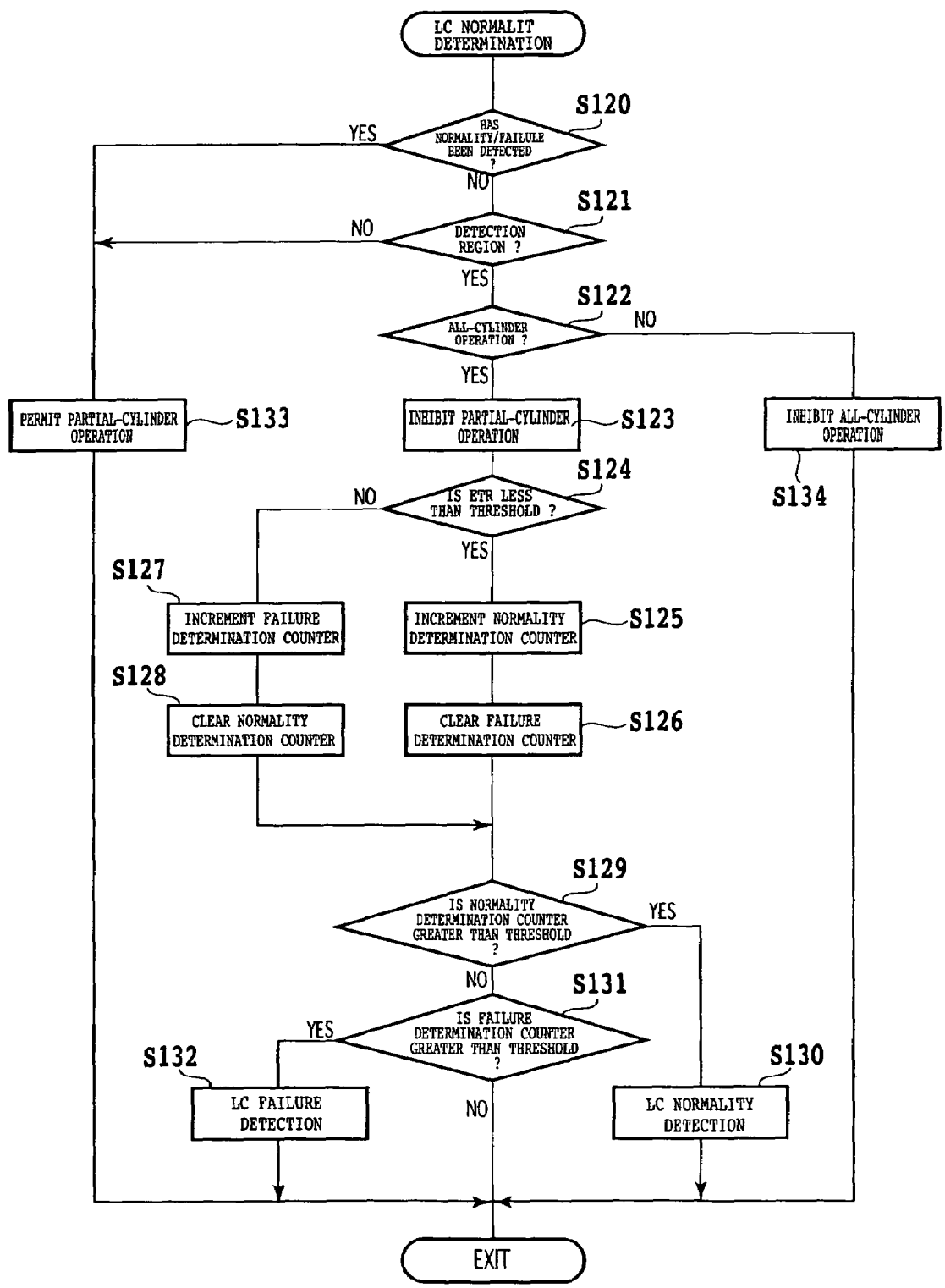
FIG. 15 is a flowchart of the LC normality determination according to the sixth preferred embodiment.

The LC normality determination according to the sixth preferred embodiment will now be described with reference to FIG. 15. In step S120, it is determined whether or not the LC normality/failure has already been detected. If the LC normality/failure has not been detected, the program proceeds to step S121 to determine whether or not the operating condition of the vehicle is in the detection region 50.

If the operating condition of the vehicle is in the detection region 50, the program proceeds to step S122 to determine whether or not the engine is in the all-cylinder operation. If the engine is in the all-cylinder operation, the program proceeds to step S123 to inhibit the partial-cylinder operation, whereas if the engine is in the partial-cylinder operation in step S122, the program proceeds to step S134 to inhibit the partial-cylinder operation.

After inhibiting the partial-cylinder operation in step S123, the program proceeds to step S124 to determine whether or not the ETR is less than the threshold. If the ETR is less than the threshold, the normality determination counter is incremented (step S125) and the failure determination counter is cleared (step S126). If the ETR is not less than the threshold in step S124, the failure determination counter is incremented (step S127) and the normality determination counter is cleared (step S128).

After clearing the failure determination counter in step S126 or clearing the normality determination counter in step S128, the program proceeds to step S129 to determine whether or not the normality determination counter is greater than a normality threshold. If the normality determination counter is greater than the normality threshold, it is meant that the normality of the lockup clutch has been detected (step S130).

If the answer in step S129 is negative, the program proceeds to step S131 to determine whether or not the failure determination counter is greater than a failure threshold. If the failure determination counter is greater than the failure threshold, it is meant that the failure of the lockup clutch has been detected (step S132). If the LC normality/failure has already been detected in step S120 or the operating condition of the vehicle is not in the detection region 50 in step S121, the program proceeds to step S133 to permit the partial-cylinder operation, and is next ended.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. A control system for a vehicle having an engine with a plurality of cylinders whose operating condition is switchable between an all-cylinder operating condition where all of said cylinders are operated and a partial-cylinder operating condition where a part of said cylinders is operated according to an operating condition of said vehicle, a torque converter with a lockup clutch connected to said engine, and a lockup clutch control device for controlling said lockup clutch, said control system comprising:
   engine switch control means for switching the operating condition of said engine between said all-cylinder operating condition and said partial-cylinder operating condition;
   failure determining means for determining a failure of said lockup clutch and said lockup clutch control device; and
   failure determination suspending means for suspending the failure determination by said failure determining means in the case that the operating condition of said engine is switched by said engine switch control means during the failure determination by said failure determining means.

2. A control system according to claim 1, wherein:
   a coupling capacity of said lockup clutch is changed by said lockup clutch control device in switching the operating condition of said engine by said engine switch control means; and
   said failure determination suspending means excludes a time period for the switch control of the operating condition of said engine by said engine switch control means from a count of an operating condition detecting duration required for the failure determination by said failure determining means.

3. A control system for a vehicle having an engine with a plurality of cylinders whose operating condition is switchable between an all-cylinder operating condition where all of said cylinders are operated and a partial-cylinder operating condition where a part of said cylinders is operated according to an operating condition of said vehicle, a torque converter with a lockup clutch connected to said engine, and a lockup clutch control device for controlling said lockup clutch, said control system comprising:
   engine switch control means for switching the operating condition of said engine between said all-cylinder operating condition and said partial-cylinder operating condition;
   failure determining means for determining a failure of said lockup clutch and said lockup clutch control device; and
   coupling capacity change inhibiting means for inhibiting a change in coupling capacity of said lockup clutch accompanied by the switch control of the operating condition of said engine by said engine switch control means during the failure determination by said failure determining means.

4. A control system for a vehicle having an engine with a plurality of cylinders whose operating condition is switchable between an all-cylinder operating condition where all of said cylinders are operated and a partial-cylinder operating condition where a part of said cylinders is operated according to an operating condition of said vehicle, a torque converter with a lockup clutch connected to said engine, and a lockup clutch control device for controlling said lockup clutch, said control system comprising:
   engine switch control means for switching the operating condition of said engine between said all-cylinder operating condition and said partial-cylinder operating condition;
   failure determining means for determining a failure of said lockup clutch and said lockup clutch control device; and
   switch inhibiting means for inhibiting the switch control of the operating condition of said engine by said engine switch control means during the failure determination by said failure determining means.

5. A control system for a vehicle having an engine with a plurality of cylinders whose operating condition is switchable between an all-cylinder operating condition where all of said cylinders are operated and a partial-cylinder operating condition where a part of said cylinders is operated according to an operating condition of said vehicle, a torque converter with a lockup clutch connected to said engine, and a lockup clutch control device for controlling said lockup clutch, said control system comprising:
   engine switch control means for switching the operating condition of said engine between said all-cylinder operating condition and said partial-cylinder operating condition;
   failure determining means for determining a failure of said lockup clutch and said lockup clutch control device; and
   forcible switching means for forcibly switching the partial-cylinder operating condition to the all-cylinder operating condition in a case that the conditions for execution of the failure determination by said failure determining means are satisfied in the partial-cylinder operating condition.

* * * * *